Oct. 10, 1967 J. H. BORDEN ETAL 3,346,074
FLEXIBLE GUIDE CLAMP SAFETY
Filed Feb. 7, 1966 5 Sheets-Sheet 2
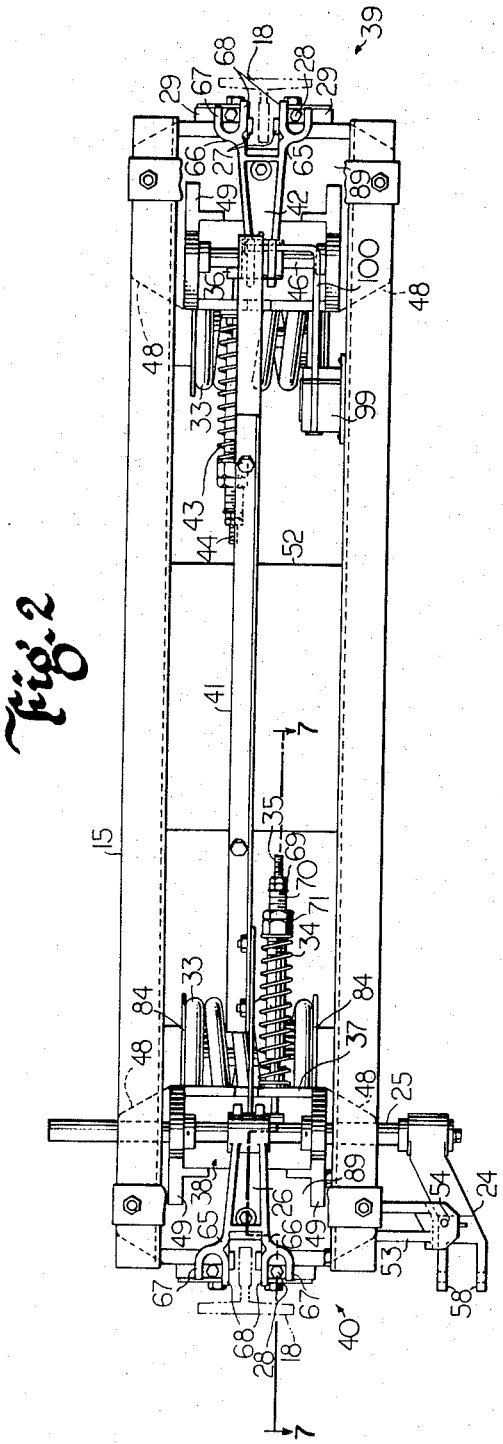
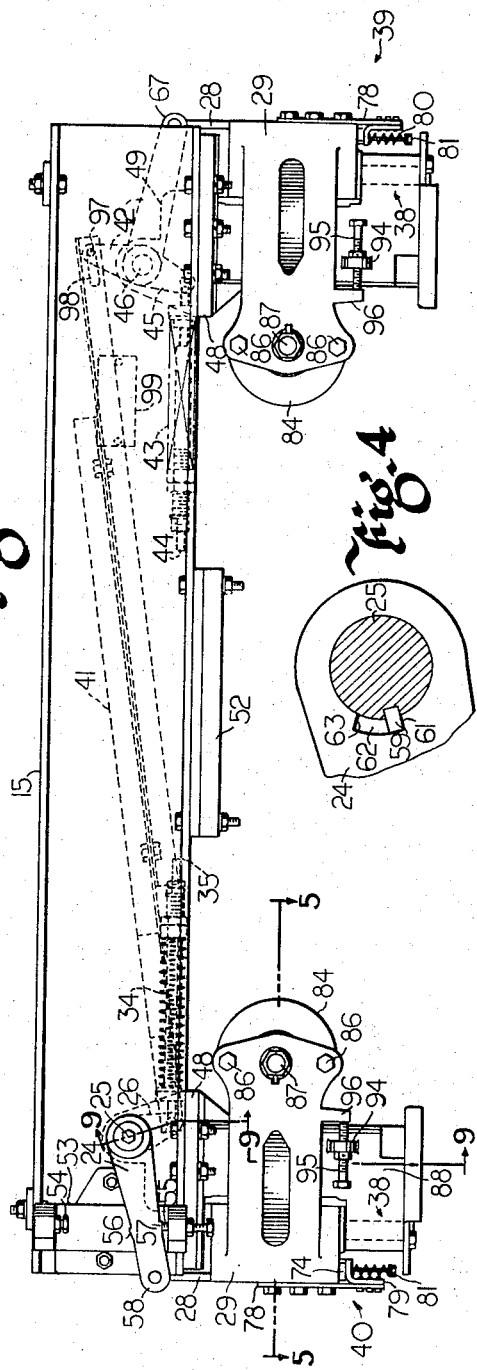
INVENTORS.
JOSEPH H. BORDEN
ROBERT O. BRADLEY
BY CARL PANTER
Marshall, Wilson & Yeasting
-attys- Oct. 10, 1967

J. H. BORDEN ET AL 3,346,074

FLEXIBLE GUIDE CLAMP SAFETY

Filed Feb. 7, 1966

INVENTORS.
JOSEPH H. BORDEN
ROBERT O. BRADLEY
BY CARL PANTER

Marshall, Wilson & Yeasting
-attys.-

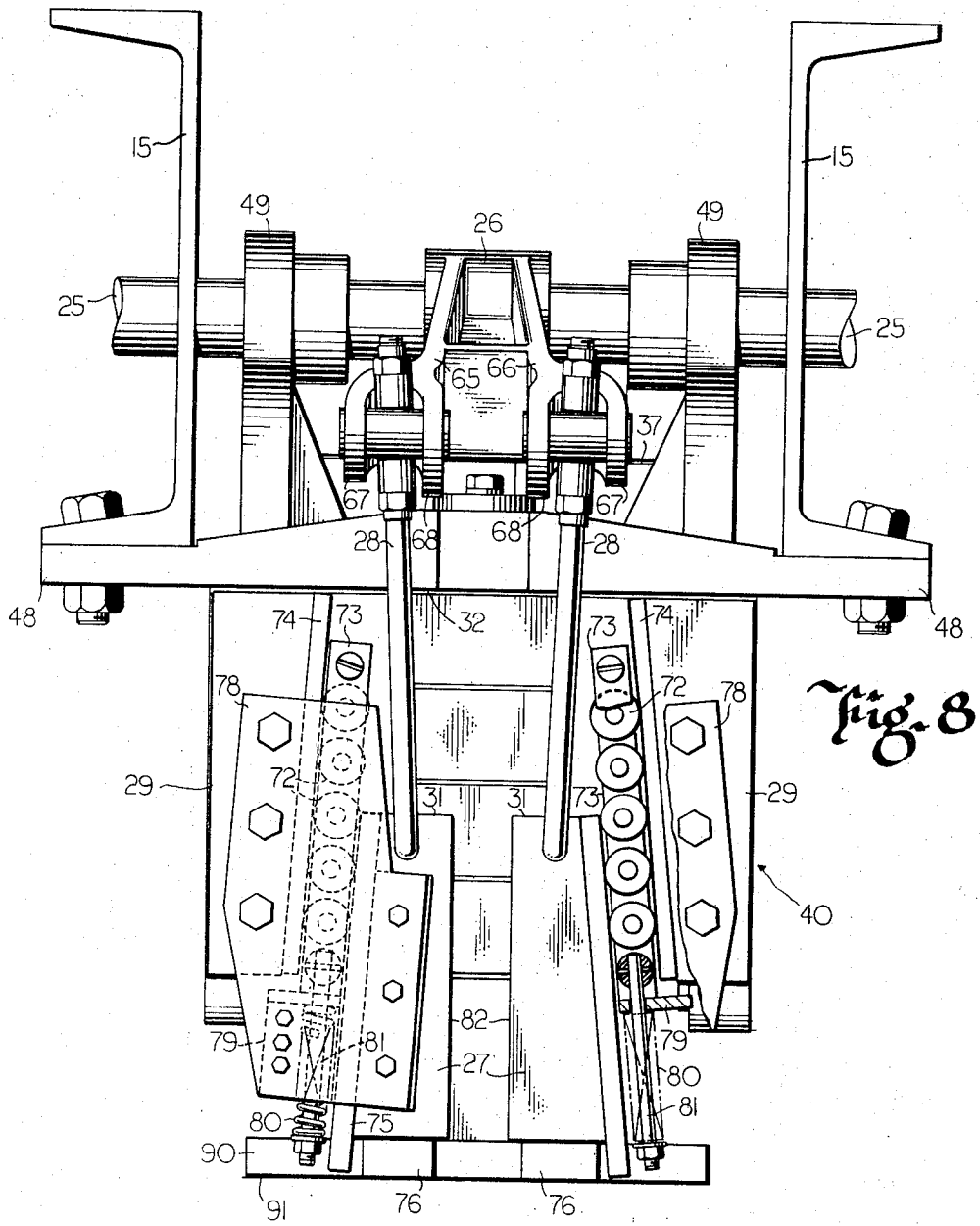

United States Patent Office 3,346,074
Patented Oct. 10, 1967

3,346,074
FLEXIBLE GUIDE CLAMP SAFETY
Joseph H. Borden and Robert O. Bradley, Toledo, Ohio, and Carl Panter, Evansville, Ind., assignors to Toledo Scale Corporation, Toledo, Ohio, a corporation of Ohio
Filed Feb. 7, 1966, Ser. No. 525,571
9 Claims. (Cl. 187—91)

ABSTRACT OF THE DISCLOSURE

A guide rail gripping safety brake having spring biased jaws which are external of the structure upon which they are pivotally supported and are readily accessible for servicing. The brake shoes adapted to engage the guide rail are mounted on rollers on the jaw faces for optimum braking characteristics by orienting the jaw faces so that they converge from the braking direction along the rail and are oriented to place the shoes parallel to the rail when the jaws are pivoted by the wedging of the shoes between the jaw faces and the rail. Lost motion couplings between the jaw assembly and an actuator therefor avoid damaging inertia effects as retardation by the brake increases.

This invention relates to safety brakes for elevators and more particularly to such devices known as flexible guide clamp safeties.

It is mandatory in most elevator utilizations to provide a brake on the car for safety stops under faulty conditions of operation such as overspeed of the car. Such brakes are also required for elevator counterweights, particularly where space below the hatchway is occupied. Ordinarily the safety brakes for cars and counterweights are of substantially different design in view of the space limitations imposed on the counterweights. In the case of car safety brakes portions of the mechanism are frequently mounted on the upper portion of the car slings while other portions are mounted below the sling. It has been common to locate the braking elements within the safety channel of the sling thereby rendering them relatively inaccessible for servicing.

An object of the present invention is to improve safety brakes.

Another object is to enable application of a single form of safety brake to both elevator cars and elevator counterweights.

A third object is to reduce the bulk and mass of safety brakes for elevator applications.

A fourth object is to improve the accessibility of the elements of an elevator safety brake to facilitate manufacture, adjustment and field servicing.

A fifth object is to simplify the form of a safety brake for elevators without sacrifice of the operation and functions attained in prior constructions.

A further object is to avoid the imposition of forces on elements of a safety brake which tend to alter the operating characteristics of the device in repetitive operations.

In one embodiment of this invention disclosed herein a flexible guide clamp safety including a pair of cooperating pivoted jaws maintained in proximity to the opposed sides of counterweight or car guide rails are effective in developing a braking force between a car or counterweight and its guide rails upon the advance of brake shoes along a path between those jaws and converging upon the rail sides to engagement with the rails. A resilient bias is developed between the jaws to provide a braking pressure between the brakes shoes and the rail sides while retaining those shoes between the jaws. Braking pressure increases with the reaction of continued car or counterweight motion upon the frictional forces tending to retard the brake shoes by virtue of the tendency to advance the shoes along their converging paths within the jaws.

Actuation of the brake shoes, initiated as by an overspeed governor through a governor cable, is applied to the safety brake assembly immediately adjacent the brake shoes to operate a linkage which advances those shoes along their converging paths and into engagement with the guide rail sides. In order to avoid imposing damaging and even destructive forces of the inertia of the system upon the gripping of a rail by the brake shoe, lost motion couplings are provided such that the initial gripping of the shoes is fed back through only a limited portion of the actuating sytem and is isolated from the inertia of such masses as the moving governor cable.

The brake shoe contact area with the rails is gradually increased in the setting of the safety brake by mounting the shoes upon the pivoted jaws so that their initial contact is along one edge of their braking face. As their setting is increased the spring biased jaws pivot against the spring force to carry the face of the brake shoes into parallelism with the rail sides at their fully seated position. The shoe path within the jaws is thus established by means of antifriction bearings rigidly and ruggedly mounted on the jaws.

The safety clamps are made up in units which are self sustaining apart from the car sling or counterweight frame to which they are applied. The basic mounting structure comprises upper and lower pedestals coupled by a column internal of the clamp jaws. The jaws are the outermost elements of the assembly and are pivoted on a common pintal extending between the pedestals and adjacent the column. A spring for applying braking forces extends transverse of the jaws and adjacent the column to tend to pivot the guide rail engaging jaw ends toward the rail. Brake shoes and their actuating elements are all supported from the upper and lower pedestals as are the various brake adjusting means. Thus, individual clamps are complete assemblies apart from the car sling and are coupled to the sling and related equipment at their pedestals.

A feature of this invention comprises a support for a common pivot for a pair of safety brake jaws mounted between the jaws to orient the jaws as the outermost element in the brake assembly.

Another feature is orientation of the entire brake shoe actuating mechanism carried by the car or counterweight in the immediate vicinity of the brake jaws.

An additional feature resides in the lost motion couplings in the brake jaw actuating mechanism which enables positive and immediate actuation of the jaw actuating mechanism from the brake tripping mechanism while preventing the transmittal of forces from the brake shoes back to the tripping mechanism.

Another feature involves a brake shoe mounting within the jaws of a flexible guide clamp safety which applies the full braking surface subsequent to the initial braking action in a manner to progressively increase the effective braking force.

The above and additional objects and features will be understood more fully from the following detailed description when read with reference to the accompanying drawings wherein:

FIG. 2 is a plan view of the guide clamp safety of this invention assembled with the safety channel for an elevator car;

FIG. 3 is a side elevation of the assembly of FIG. 2;

FIG. 4 is an enlarged detail of the lost motion coupling between the operating arm and the wedge lift lever shaft;

FIG. 8 is a front elevation of the safety with portions thereof sectioned; and

Figure 1:
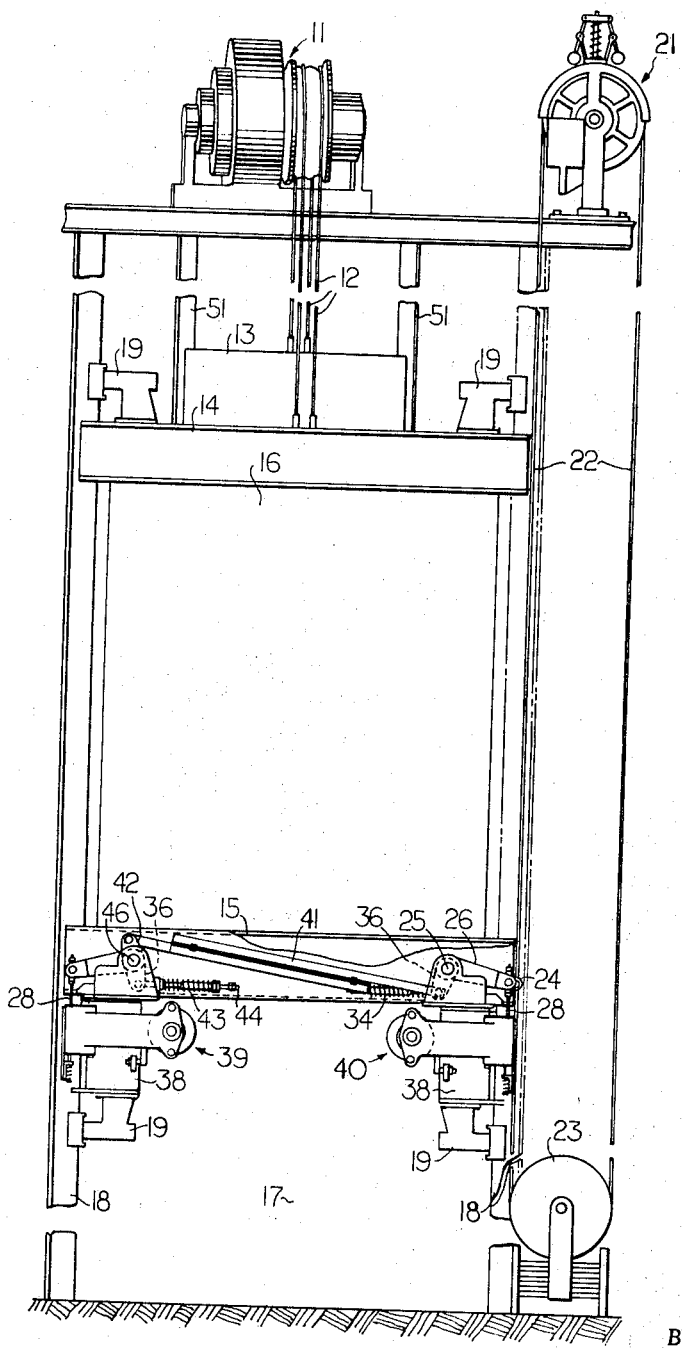
FIG. 1 is a diagrammatic view showing an elevator car sling without the cab detail equipped wtih the guide clamp safety of this invention.

A typical elevator installation is represented by FIG. 1 wherein a hoist machine 11 drives hoist cables 12 secured to a counterweight 13 and to the top beam 14 of a car sling having a safety channel 15 and a cab 16. The car sling is guided along a hatchway 17 by guide rails 18 upon which ride suitable guides 19 secured to the sling. A flyball governor 21 has a governor rope 22 secured at its two ends to the car assembly and its lower reach trained over a tensioning sheave 23 so that upon overspeeding of the car control switches are actuated (by means not shown) and the governor cable is retarded to impose an upward tension force at its coupling to the car assembly.

Figure 6:
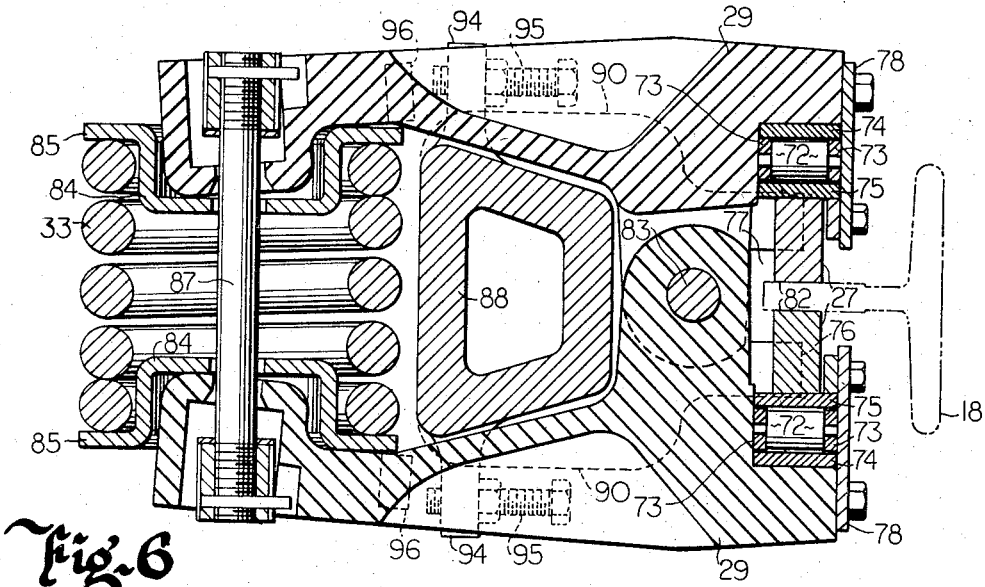
FIG. 6 is a diagrammatic sectioned plan as FIG. 5 showing the position of the elements with the brake set.

Increased tension in the governor rope 22 as a car overspeeds while descending lifts safety clamp operating lever 24 to rotate shaft 25 and wedge lift lever 26. The wedges 27 are coupled to lever 26 by wedge lift rods 28. As best seen in FIG. 8 the lifted wedges follow a path which converges upon the rail 18. Once their operating faces are retarded by the rail, further descent of the car and the safety clamp jaws 29 causes additional relative movement of the wedges with respect to the jaws so that the top 31 of the wedges approach the upper limits 32 of their travel as defined by the upper pedestal of the support base and the jaws are forced apart in opposition to the bias of rail pressure spring 33 to the position shown in FIG. 6.

Figure 7:
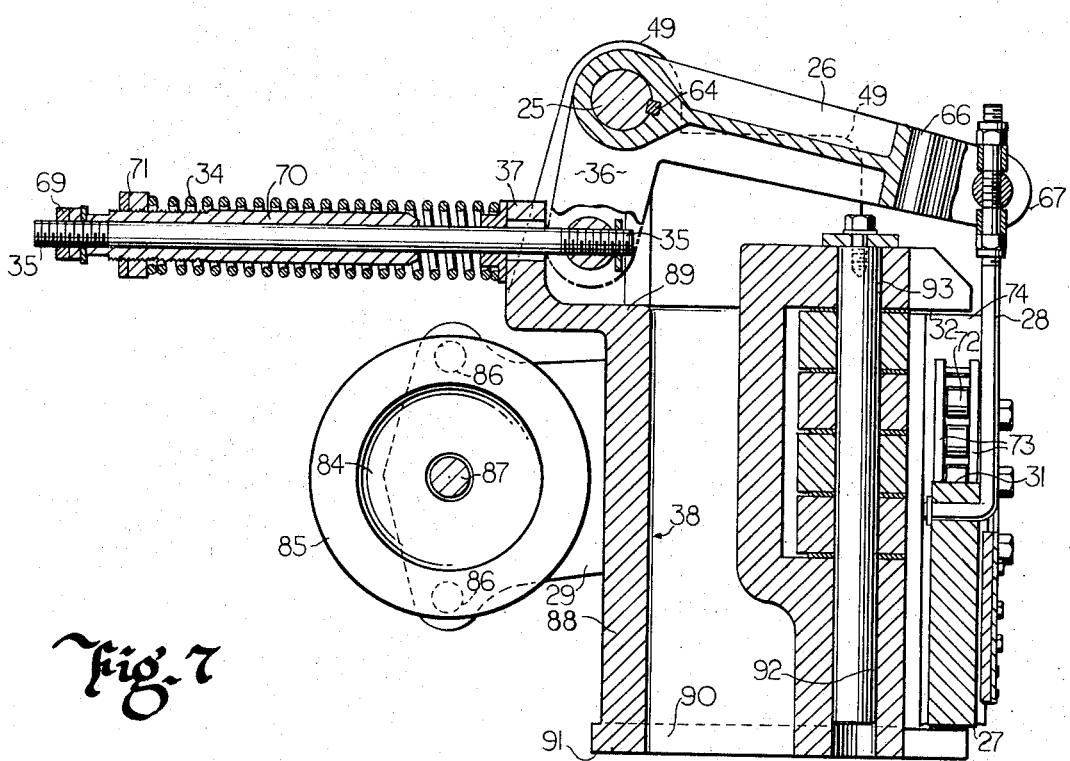
FIG. 7 is a sectioned side elevation of the safety taken along the line 7—7 of FIG. 2.

Spring 33 establishes the braking pressure between wedges 27 and the sides of rail 18. Normally the spring 33 maintains the jaws in a relatively closed position and wedges 27 are maintained out of engagement with the sides of rail 18 by a compression spring 34 coupled to a rod 35 secured to retraction arm 36 of wedge lift lever 26. Spring 34 is seated against a lug 37, FIG. 7, on the support base 38 for the safety clamp. Spring 34 tends to rotate retraction arm 36 counter clockwise around the axis of shaft 25 thereby maintaining lift rods 28 and wedges 27 at the bottom of their travel as viewed in FIG. 3. It is the retraction force of spring 34 which is overcome by the tension in governor rope 22 to set the safety clamp.

A flexible guide clamp is shown for each car rail in FIG. 1. That clamp 39 spaced from the operating lever 24 is coupled to the clamp 40 adjacent the lever through a connecting link 41 coupled to the wedge lift levers 26 and 42 of each clamp. Lever 42 is held in its wedge retracted condition by a compression spring 43 active on rod 44 coupled to retraction arm 45 of lever 42. Clockwise rotation of lever 42 around the axis of its mounting shaft 46 lifts lift rods 28 to bring wedges 27 into engagement with the sides of rail 18. Thus both clamps are actuated simultaneously by tension on governor rope 22 to initiate setting of the safety.

Figure 9:
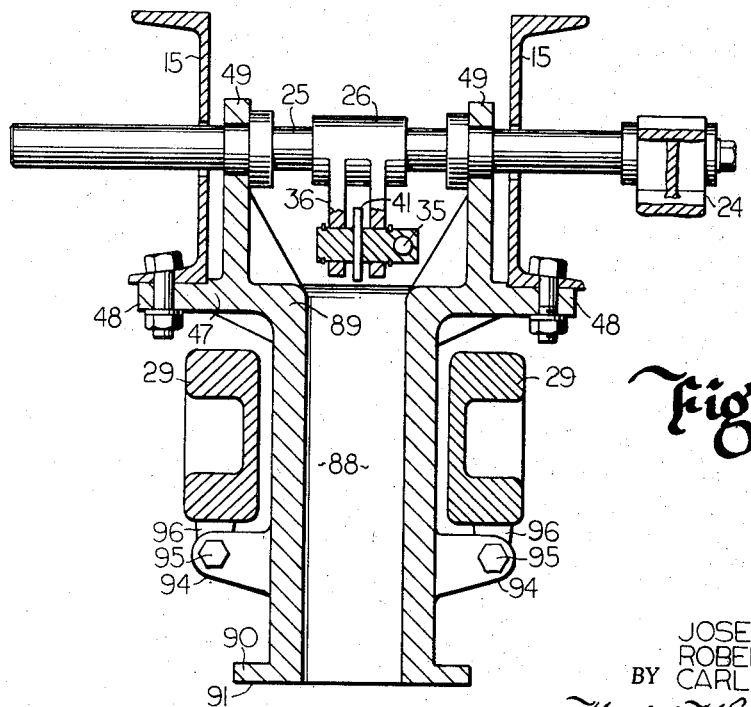
FIG. 9 is a sectioned front elevation taken along the line 9—9 of FIG. 3.

While the following detailed description will be confined to application of the safeties of this invention to an elevator car, it is to be appreciated that where appropriate these safeties are readily adapted to mounting on counterweight frames. Such mounting can be accomplished by cutting away at 47 the excess flange 48 employed to secure the upper pedestal of the mounting base 38 to the safety channel as shown in FIG. 9 and by bolting the flange 49 which is perpendicular thereto a suitable face of the counterweight frame (not shown). In such an application the operating lever corresponding to lever 24 and the shaft corresponding to shaft 25 are suitably oriented to avoid interference with the structure adjacent the counterweight path of travel and the clamp safeties operate on the counterweight rails 51. It will be noted that the remaining elements of the clamp and actuator do not project transversely to the extent the cut away flange 48 projects as viewed in FIGS. 8 and 9 so that a significant narrowing of the structure is achieved for counterweight utilizations.

Referring now to the assembly as shown in FIG. 2, a safety channel 15 is shown made up of two channels coupled by a buffer striker plate 52 and by the support base flanges 48 bolted to the channel flanges adjacent the opposite ends of the channels. Shafts 25 and 46 for clamps 40 and 39, respectively, pass through suitable apertures in the webs of the two channels. Operating lever stop bracket 53 is bolted to the outer face of the channel web adjacent and in operative relationship to operating lever 24. Upper and lower stop screws 54 and 55 fit into tapped apertures in lugs projecting from bracket 53 in a manner to engage bearing surfaces 56 and 57 on lever 24 to define adjustable the limits of travel of the lever.

Lever 24 is actuated from governor rope 22 through suitable cable couplings such as a thimble, shackel or other connector (not shown) engaging a pin in a suitable aperture in the bifurcated ends 58 on the lever. Operating lever 24 fits on operating shaft 25 and is held in place longitudinally of the shaft by suitable retainers. It is journaled on the shaft to rotate with respect thereto. As noted above, compression spring 34 biases shaft 25 counterclockwise as viewed in FIG. 3 and thereby rotates shaft 25 relative to lever 24 to carry key 59 against the lower side 61 of a keyway in lever 24. Key 59 has a force fit in a keyway in shaft 25. The key 59 fits into a wide keyway 62, FIG. 4, subtending an arc in the shaft receiving aperture in arm 24 corresponding to the range of travel equal to that caused by the rotation of shaft 25 to carry the wedges through their full range of travel. This wide keyway permits limited rotational movement of the shaft relative to the arm until key 59 engages the upper side 63 of enlarged keyway 62. This freedom of movement provides a lost motion connection which protects the elements of the safety clamp from damaging forces as the wedges or brake shoes 27 are retarded on the rails 18 and cause rotation of wedge lift lever and shaft 25 in a clockwise direction. Such damage arises from the inertia of the governor cable 22 which tends to continue to move with the car at the speed of the car at the time the wedges set and therefore carries the lever against its lower stop 57. Without this lost motion coupling the counterclockwise moment on the lever 24 would oppose the clockwise moment on shaft 24 and develop destructive forces in the pins, shafts, and levers actuating the wedges.

Shaft 25, as can best be seen in FIGS. 2 and 9, is journaled in apertures in flanges 49 adjacent the inner faces of the webs of the channels making up the safety channel 15. These apertures are in registry with the web apertures. Wedge lift lever 26 is fixedly keyed to shaft 25 by key 64. Its operating arm is double bifurcated first to straddle the guide rail 18 as at ends 65 and 66 and again at 67 and 68 to provide journals for pins which receive the ends of lift rods 28. The retraction arm 36 of wedge lift lever 26 extends from shaft 25 at right angles to the portion of the lever engaging rods 28. At its end remote from shaft 25 it supports couplings to rod 35 and link 41.

The retracting force tending to rotate shaft 25 counterclockwise is adjusted by means of an adjusting nut 69 threaded on rod 35. Nut 69 bears against the end of a tube 70 having an inner diameter closely fitting the rod 35 and an outer diameter fitting within spring 34. Further adjustment of spring compression is afforded by a nut 71 on the threaded exterior of tube 70 and providing a seat for the end of spring 34.

The clamp jaws 29 define a path for wedges 27 as best seen in FIG. 8. The safety clamp retards and stops a descending car or counterweight by utilizing the relative motion between the jaws 29 and the sides of rails 18 to advance the wedges upwardly, as viewed in FIG. 8. Antifriction roller bearings 72 in a cage 73 operate on races 74 converging upwardly. Each wedge 27 has a race 75 also engaging rollers 72. A flange 76 extending from the bottom of support base 38 toward the back of rail 18 and notched at 77 to clear the top of the rail limits the downward movement of wedges 27. A cover plate 78 contains the bearing cage 73 and wedges 27 against movement toward the back of the rail the downward travel of the bearing cage 73 is restricted by an angle bracket 79 on the cover plate 78. The cage is biased downward by a compression spring 80 seated against bracket 79 and coaxially embracing rod 81 passing through an aperture in bracket 79 and coupled to cage 73. With this arrangement the bearing cage 73 is retained at its lower limit of travel until wedge 27 is raised into contact with rail 18 and begins to develop pressure between the jaw and rail. Further retardation of the wedge by frictional forces at the rail increases the pressure between the wedge and jaw to a degree requiring a rolling upward advance of the rollers 72 which carries the cage 73 upward against the biasing force of spring 80.

Figure 5:
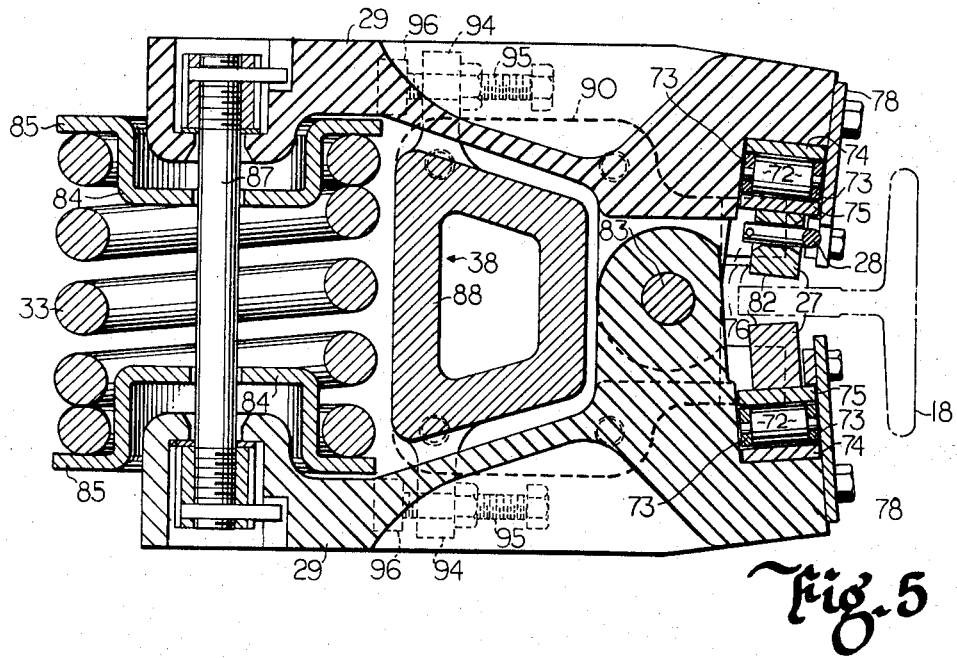
FIG. 5 is a sectioned plan of the safety jaws of FIG. 3 taken along the line 5—5 with the jaws in released position.

In FIG. 5 the axis of the rollers 72 and the braking face 82 of wedges 27 are not parallel with the sides of rail 18. This represents the condition of the clamp and the wedge-rail orientation when the safety is released and during the initial setting in which the wedge faces 82 begin to be frictionally retarded upon the rail. The illustrated position is established by rail pressure spring 33 which tends to spread jaws 29 apart at their ends remote from the rail and thus to close their ends adjacent the rail upon the rail by the pivoting action around common pivot pin 83. When the wedges 27 are carried upward by the retarding frictional forces on the rail they force the ends of the jaws 29 adjacent the rails outward causing the jaws to pivot around pin 83 and compress spring 33 to the position shown in FIG. 6.

Upon pivoting of the jaws to the full set position of the safety the axis of the roller bearings 72 are carried into parallelism with the sides of rail 18 as are the bearing faces of those rollers and the braking faces 82 of the wedges 27. Thus by proper orientation of the wedges in the jaws they engage the rail sides initially along essentially a line contact which with increased pressure tends to widen and ultimately to be turned into full face-to-face relation. The angle of inclination of the wedge faces 82 to the rail sides for a released clamp is equal to that subtended by the arc through which the jaw is displaced between the released and full set positions.

Jaw pressure at full setting is determined by the degree of compression of spring 33. A cup-shaped spring seat 84 is nested within each end of spring 33 so that peripheral flanges 85 provide bearing surfaces which are engaged by studs 86 threadedly mounted on the jaws. A tie rod 87 extends along the axis of spring 33 and into suitable cavities in the ends of jaws 29 to retain the spring, seats and jaws properly assembled. Spring pressure is applied to the jaws at diametrically opposed points on the seats which are equally spaced radially from the jaw pivot at 83 through the adjustment of studs 86. Thus as the jaws are spread at the clamp ends no cocking forces are imposed on the spring 33.

In order to reduce the width of the clamp assembly its support base 38 is fitted within jaws 29. It comprises a column 88 extending from an upper platform 89 to a lower platform 90. The lower platform provides a seat 91 for supplemental equipment such as the guides 19 shown in FIG. 1, and further supports the flange 76 partially defining the cavity in which the wedges 27 are retained. A gudgeon 92 is formed in the lower platform to cooperate with a gudgeon 93 in the upper platform in sustaining jaws 29. It is from flanges 49 extending perpendicular to the upper platform 89 that the operating shaft 25 is journaled.

Jaw centering lugs 94 extend from each side of column 88 to support centering screws 95. Ears 96 depend from each jaw to provide bearing surfaces for screws 95 whereby the advance of a screw moves the spring end of the jaw toward the centerline of the clamp thereby moving the wedge end away from the rail side.

While it is desirable that both clamps bring their wedges 27 into contact with the rail sides and initiate their retardation on the rails simultaneously it is to be recognized that such optimum operation cannot be anticipated universally. Irregularities in the rails, their surface condition or their degree of lubrication can cause even a precisely adjusted pair of clamps to become effective at different points in the actuation of lever 24. In order to avoid the transmission of an early retardation from clamp 39 to clamp 38 and the operating lever 24, a lost motion coupling is provided between link 41 and operating lever 42. This coupling is in the form of a pin 97 through apertures in the bifurcated end of wedge lift lever 42 and fitted into an elongated slot 98 in link 41. Compression spring 43 biases retracting arm 45 of clamp 39 clockwise as viewed in FIG. 3 and thus maintains pin 97 at the righthand end of slot 98 when the clamp is released and during its actuation from operating shaft 25. However, the retardation of wedges 27 of clamp 39 on rail 18 resulting in lifting rods 44 and rotating wedge lift lever 42 counterclockwise has no effect upon link 41 since pin 97 merely slides toward the lefthand end of slot 98 as viewed in FIG. 3.

As shown in FIG. 2 a safety switch 99 is actuated by a switch rod 100 extending from lever 42. This switch is adjusted to open its contacts when the lever 42 has been actuated sufficiently to carry the wedges a predetermined distance. Thus in the exemplary structure where the wedge has a maximum stroke of 3⅜ inches and travels 2 inches prior to gripping the rail, the switch rod 100 is adjusted to open the switch contacts when the lever has been actuated for two inches of wedge travel.

In recapitulation of the invention it comprises an external set of jaws readily accessible for manufacture, adjustment and servicing and embracing a supporting base upon which all of the clamp structure and actuating means is mounted. The supporting base comprises an upper and lower pedestal joined by a column extending between the jaws. Pivotal mounting of the jaws by a common pintle extending between gudgeons in the upper and lower pedestal permit a compact structure. A brake spring tends to spread the jaws on one side of the pintle thereby tending to close them on the opposite side at rail engaging opposed inner faces. These faces are arranged to be inclined with respect to each other and the sides of the rail in the horizontal plane and are converging upward.

Brake shoes in the form of wedge blocks which are rectangular in the horizontal plane are provided with lifting mechanism supported from the base. The brake shoes are wedge shaped to conform their faces adjacent the clamp jaws to the converging faces and to maintain their opposed faces vertical. The lift mechanism advances the wedges along the converging faces so that the opposed faces engage the sides of the guide rails and are wedged between the jaws and the rails. This spreads the jaws. The arc of movement of the jaws is limited. The angle subtended by this arc in the horizontal plane is equal to the angle of misalignment in the horizontal plane of the opposed faces of the jaws and the brake shoes when the shoes are free of the rail. Thus when wedged against the rail to spread the jaws the opposed faces are brought into parallelism with each other and the sides of the rail.

In the released condition the jaws are equally spaced from the guide rail sides by adjusting screws which impose a moment around their pivot axis at the pintle. This enables the jaws to be arranged for only limited movement when in the full set condition.

Feedback of damaging forces from the setting of the brake shoes on the rails to the clamp actuating mechanism is avoided by lost motion connections between the clamp actuating means, the governor cable or cross connecting link, and the wedge lift lever. One such connection is an enlarged keyway for a key coupling the wedge lift lever operating shaft to the cable actuated lever so that relative rotation can occur between the shaft and lever. Another is an elongated slot in the cross link receiving a pin from a lift lever. In each lost motion connection driving forces can be directly transmitted in the wedge lifting direction from the actuating mechanism while the travel of the wedge over its effective range cannot be fed back to the actuating mechanism.

We claim:

1. A flexible guide clamp safety comprising a pair of jaws, a column perpendicular to the plane of motion of said jaws and having an upper and lower pedestal integral therewith, said column being positioned between said jaws, said upper and lower pedestal being located above and below said jaws respectively, axially aligned gudgeons in each pedestal to define a common pivot axis for said jaws, a pintle pivotally mounting said jaws and fitting within said gudgeons, shoes for engaging a guide rail mounted on opposed inner faces of said jaws on one side of said pintle, and a braking coil spring having its axis transverse of said jaws and engaging said jaws near their ends on the side of said pintle opposite said shoes, said column being between said pintle and said spring.

2. A combination according to claim 1 including a jaw centering means for each jaw located on said column to restrict the excursion of said shoes from said rail sides by limiting the rotation of said jaw around said pintle.

3. A combination according to claim 1 including faces which converge upwardly on said opposed inner faces of said jaws, said shoes being wedge shaped to conform on their faces adjacent said opposed jaw faces to said opposed faces and to have opposed inner faces which are vertical, a lift mechanism for raising said shoes along said converging faces and engage the sides of a guide rail, actuating means for said lift mechanism, and a lost motion coupling between said shoes and said actuating mechanism.

4. A combination according to claim 3 wherein said lost motion coupling comprises an operating shaft for said lift mechanism, a key on said shaft, an actuating lever journaled on said shaft for rotation relative thereto and having a keyway therein permitting relative rotation of said shaft and lever through an arc at least equal to the actuating arc for said lift mechanism, mechanical limits restricting the motion of said lever to the actuating arc, and means to resiliently bias said shaft and key against the wall of said keyway through which actuating force is transmitted from said lever to said shaft.

5. A combination according to claim 3 wherein said lost motion coupling comprises a reciprocating bar having an elongated slot, means to advance said bar through a limited travel in a first direction in response to a wedge lifting operation of said actuating means, said elongated slot having a length along said path of movement of said bar at least equal to the limited travel, and a pin in said slot having a freedom of movement therealong at least equal to the limited travel, said pin driving said lift mechanism to raise said shoes.

6. A combination according to claim 1 wherein said opposed inner faces converge upwardly and diverge inwardly toward said pintle, said shoes being rectangular in horizontal cross section and wedge shaped to conform on their faces adjacent said opposed jaw faces to said faces and to have opposed inner faces which are vertical, and a lift mechanism for raising said shoes along said converging faces of said jaws to engage the sides of a guide rail, said jaws having a limited arc of movement away from said guide rail as said shoes are wedged between said jaws and rail, said arc subtending an angle equal to the angle of divergence of said opposed inner faces to permit movement of the inner faces of said shoes into a parallel relationship as said shoes are wedged between said jaws.

7. A combination according to claim 6 including cylindrical antifriction roller bearings between said opposed inner faces of said jaws and said shoes.

8. A combination according to claim 2 wherein said jaw centering means comprises a lug extending from said column generally normal to the length of its respective jaw, a bearing pin having a screw threaded coupling to said lug, and a bearing surface on said jaw engaged by said bearing pin.

9. A flexible guide clamp safety brake comprising a safety brake jaw assembly, a brake actuator assembly, a lost motion coupling between said jaw assembly and said actuator assembly arranged so that motion of said actuator assembly drives said brake jaw assembly from a released to a braking position, a first limit for said actuator assembly defining a position of said actuator when said coupling is in driving relation between said actuator and said jaw assembly and said safety brake is released, and a second limit for said actuator for defining a limit of motion for said actuator for setting said brake, said lost motion coupling permitting motion of said actuator assembly over a range of travel between said first and second limits and toward said first limit without driving said jaw assembly.

References Cited

UNITED STATES PATENTS

| | | | |
|---|---|---|---|
| 1,268,114 | 6/1918 | Grenier | 187—91 |
| 1,702,384 | 2/1929 | Hymans | 187—88 |
| 2,274,000 | 2/1942 | Sahlin | 187—90 |

EVON C. BLUNK, *Primary Examiner.*

H. C. HORNSBY, *Assistant Examiner.*